(12) United States Patent
Cheng

(10) Patent No.: US 7,489,919 B2
(45) Date of Patent: Feb. 10, 2009

(54) METHOD AND SYSTEM FOR REGISTERING COMMUNICATION SYSTEMS TO WIRELESS TERMINALS

(75) Inventor: Ray-Guang Cheng, Keelung (TW)

(73) Assignee: Qisda Corporation, Taoyuan County (TW)

( * ) Notice: Subject to any disclaimer, the term of this patent is extended or adjusted under 35 U.S.C. 154(b) by 198 days.

(21) Appl. No.: 10/935,987

(22) Filed: Sep. 8, 2004

(65) Prior Publication Data

US 2005/0058096 A1    Mar. 17, 2005

(30) Foreign Application Priority Data

Sep. 12, 2003  (TW) ............... 92125163 A

(51) Int. Cl.
*H04M 1/66* (2006.01)
(52) U.S. Cl. ............ 455/411; 455/446; 455/436; 370/331; 370/338
(58) Field of Classification Search .............. 455/411
See application file for complete search history.

(56) References Cited

U.S. PATENT DOCUMENTS

| | | | |
|---|---|---|---|
| 6,175,737 B1 * | 1/2001 | Kao | 455/447 |
| 6,822,971 B1 * | 11/2004 | Mikkonen | 370/475 |
| 7,096,014 B2 * | 8/2006 | Haverinen et al. | 455/432.1 |
| 7,221,961 B1 * | 5/2007 | Fukumoto et al. | 455/557 |
| 7,263,357 B2 * | 8/2007 | Lee et al. | 455/432.1 |
| 2001/0046839 A1 * | 11/2001 | Latva-Aho et al. | 455/3.05 |
| 2002/0009199 A1 | 1/2002 | Ala-Laurila et al. | 380/247 |
| 2002/0080968 A1 * | 6/2002 | Olsson | 380/270 |
| 2002/0176377 A1 * | 11/2002 | Hamilton | 370/328 |
| 2002/0177431 A1 * | 11/2002 | Hamilton et al. | 455/406 |
| 2003/0114158 A1 * | 6/2003 | Soderbacka et al. | 455/436 |
| 2003/0119481 A1 * | 6/2003 | Haverinen et al. | 455/411 |
| 2003/0139180 A1 * | 7/2003 | McIntosh et al. | 455/426 |
| 2003/0157937 A1 * | 8/2003 | Oikarinen et al. | 455/445 |
| 2004/0068571 A1 * | 4/2004 | Ahmavaara | 709/228 |
| 2004/0203863 A1 * | 10/2004 | Huomo | 455/456.1 |
| 2005/0048950 A1 * | 3/2005 | Morper | 455/410 |
| 2005/0090235 A1 * | 4/2005 | Vermola et al. | 455/414.3 |
| 2005/0239441 A1 * | 10/2005 | Eronen | 455/411 |

OTHER PUBLICATIONS

"Converged WLAN/GPRS Network Based on Mobile IP" Tsinghua Tongfang Optical Disc Co., Ltd.

* cited by examiner

*Primary Examiner*—Lester Kincaid
*Assistant Examiner*—Diego Herrera

(57) ABSTRACT

A method and a system for wireless terminals registering a communication system, comprising wireless terminals, public land mobile network (PLMN), wireless local area network (WLAN), Wherein the wireless terminals are able to communicate with both the PLMN and the WLAN. The PLMN coverage overlaps the WLAN coverage linking the two together. First, the wireless terminal obtains an ID, attaches to a PLMN, and then transmits the ID to PLMN to authenticate and register. After authentication, the PLMN generates an authentication code and transmits the code to a wireless terminal. Additionally, the PLMN transmit the authentication code to at least one WLAN. The wireless terminals must communicate with at least one WLAN.

25 Claims, 9 Drawing Sheets

METHOD AND SYSTEM FOR REGISTERING COMMUNICATION SYSTEMS TO WIRELESS TERMINALS

BACKGROUND OF THE INVENTION

1. Field of the Invention

The present invention relates to a method for registering wireless terminal to a communication system and in particular to a method for securely registering a wireless LAN (WLAN).

2. Description of the Related Art

In U.S. patent application Pub No: 2002/0009199 and in "Wireless LAN Access network architecture for mobile operators" IEEE communication magazine Vol 39, No 11 pp. 82~89, November 2001, a method and a system is disclosed for obtaining a ciphering key via a wireless local area network (WLAN). The obtained ciphering key is applied to encrypt data transmitted between WLANs and wireless terminals. As shown in FIG. 1, GPRS network 100 comprises a base transceiver station (BTS)114, a radio access network (RAN) 104, a serving GPRS support node (SGSN) 106, a GPRS gateway support node (GGSN), a mobile switch center with a home location register (MSC/HLR) 110, and a GPRS billing gateway 112. Each of the above is connected via a cell mobile network 116. The wireless terminal 20, comprising a WLAN adapter and a SIM card, is capable of registering the GPRS network by the SIM card.

The wireless terminal 20 can register a WLAN network by a user ID stored in the wireless terminal 20. The user ID may be predetermined corresponding to the SIM card. The user ID transferred from either access point 202a or 202b is delivered to access control device 204. The access control device 204 manages the registration processes of the wireless terminals and filters out the packets from unauthorized wireless terminals. The access control device 204 also delivers the user ID by internet protocol (IP) network 22 to the authentication server 206 (step S102). The authentication server 206 requests the authentication information of the wireless terminal 20 from remote mobile switching center or home location register (MSC/HLR) (step S103). The access control device 204 obtained authentication information from the authentication server 206 then manages the register request from the wireless terminal 20.

Because the international mobile subscriber identity (IMSI) information is needed for the registration process to MCS/HLR 110, the packets including IMSI of the wireless terminal 20 delivered from access points 20a or 20b pass through the IP network 22 to reach MCS/HLR 110. When the wireless terminal 20 moving forward and backward between the access points, it will cause duplicate login to MCS/HLR 110 and caused decreasing the performance of the network and increasing delay of end-to-end communication between mobile stations or (MS-to-MS). Also, unencrypted packets comprising IMSI are delivered via an open network, such as an IP network. The unsecured data transmission over the network exposes entire system to threats, such as data theft.

The 3GPP protocol combines the global systems of mobile (GSM) network, the general packet radio service (GPRS) and the universal mobile telecommunication system (UMTS) in an attempt to provide a well-developed architecture for protecting the IMSI in wireless communication. For example, only the temporary mobile station number (TMSI) or packet temporary mobile station number (P-TMSI) is delivered during transmission. The relationship between IMSI and P-TMSI or TMSI is stored in a visited location register (VLR) of SSGN, and the information updates periodically.

SUMMARY OF THE INVENTION

Accordingly, an object of the present invention is to provide a method for registering a communication system. Wherein by initialing the standard register process, i.e. 3GPP standard, wireless terminals are able to register at least one WLAN securely and efficiently by initializing the register process.

Another object of the invention is to provide a communication system with the method described above, wherein wireless terminals belonging to the communication system are able to register at least one WLAN network securely and efficiently.

To achieve the above and other objects, the present invention provides a method for registering a communication system. The communication system comprises wireless terminals, a Public Land Mobile Network (PLMN) and at least one Wireless Local Area Network (WLAN), wherein the wireless terminals access the PLMN and the WLAN. The coverage area of the PLMN overlaps the WLAN. The PLMN and the WLAN connect to each other. When initialized, an user ID is assigned to a wireless terminal, subsequently, the wireless terminal connects to a PLMN, transmits the user ID to the PLMN, and is authenticated via the ID. After successful authentication, the PLMN generates an authentication code and transmits the authentication code to the wireless terminal. Additionally, the PLMN transmits the authentication code to at least one WLAN. Then, the wireless terminals may communicate with at least one WLAN.

According to the method of the present invention, a communication system comprising a WLAN, a PLMN, and wireless terminals is provided. Wireless terminals with different user IDs communicate with the PLMN and the WLAN, and then transfer the user IDs, the user ID may be IMSI, to register the PLMN, wherein the PLMN generates an authentication code and then transmits it to the WLAN and the wireless terminals. The wireless terminals register the WLAN by the authentication code.

Additionally, wireless terminals comprising transmission units, receiving units and memory, the wireless terminals communicate with the PLMN and the WLAN. The memory of the wireless terminal stores the user ID. The transmission unit transfers the user ID to the PLMN to be registered. After successful register, the PLMN generates and transmits an authentication code to the WLAN and wireless terminals. Thereof the receiving unit that stores the received authentication code in memory. The wireless terminals communicate with the WLAN via the authentication code.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The method provided by the present invention for registering a communication system is compatible with a wireless communication system comprising wireless terminals, Public Land Mobile Networks (PLMN) and at least one Wireless Local Area Network (WLAN). The coverage area of the PLMN overlaps the WLAN and both networks are connected. FIG. 2 to FIG. 5 describe the architectures thereof.

Figure 1:
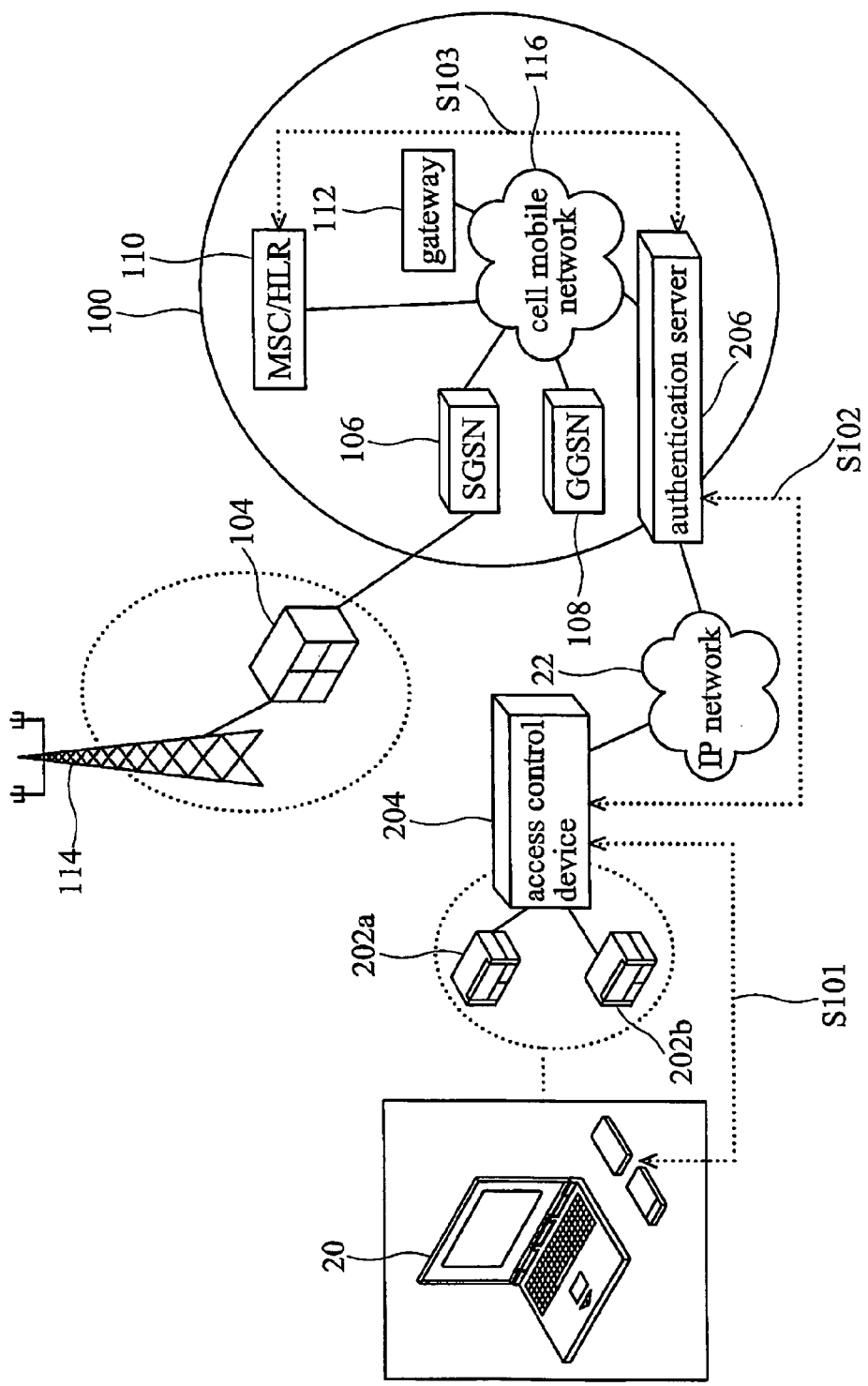
FIG. 1 is a block diagram of the conventional WLAN.
Figure 2:
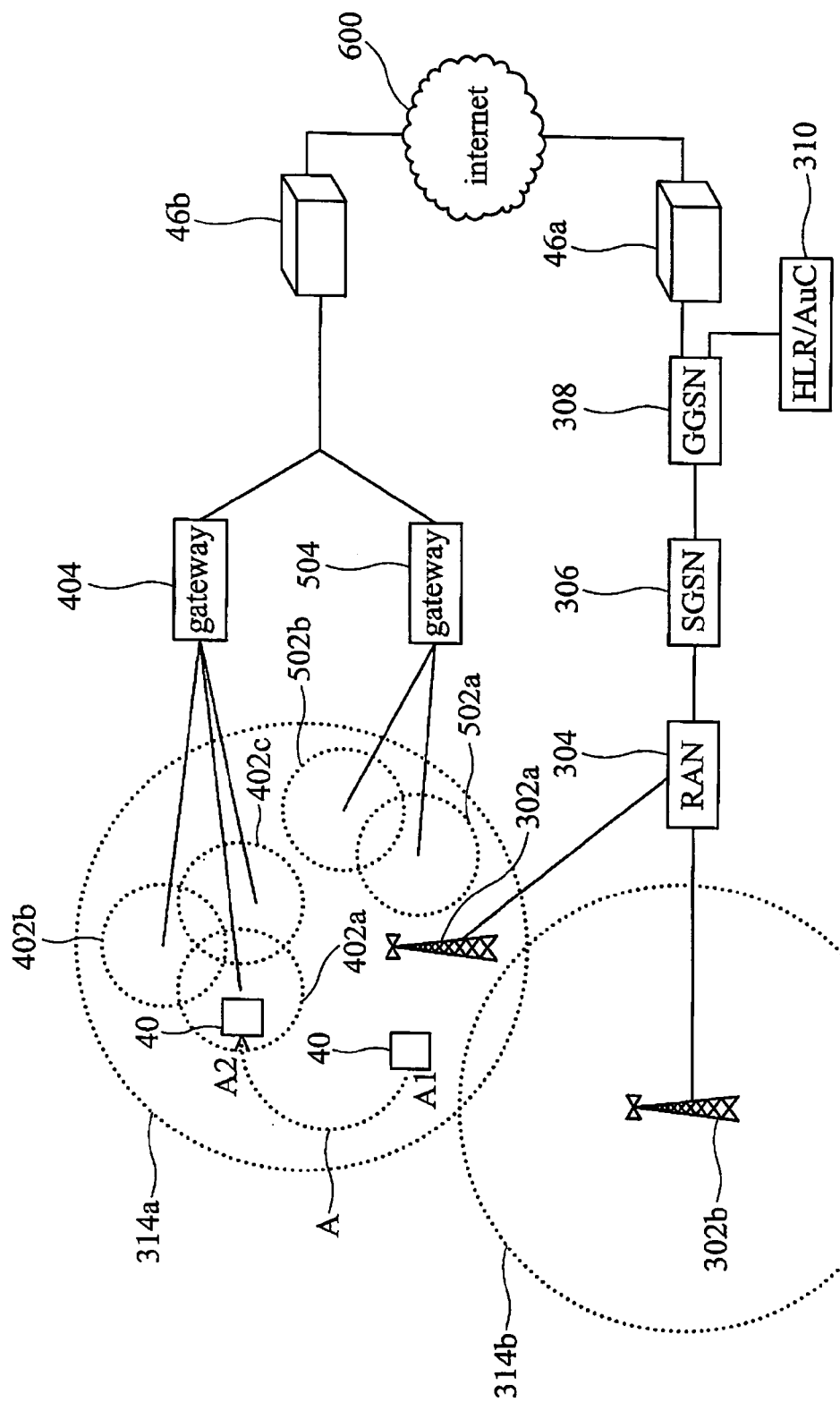
FIG. 2 is a block diagram showing the connection between PLMN and WLAN by mobile IP.

FIG. 2 shows the architecture of a WLAN and a PLMN connected via Mobile IPs. As shown in FIG. 2, there are three wireless systems in the same area. One is a PLMN system, such as a General Packet Radio service (GPRS) or a Universal Mobile Telecommunication System (UMTS), while the other two are WLAN systems. As shown in FIG. 2, a PLMN system comprises 2 Base Transceiver Stations (BTS) 302a and 302b, a Radio Access Network (RAN) 304, a Serving GPRS Support Node (SGSN) 306, a GPRS Gateway Support Node (GGSN) 308, and a Home Location Register with Authentication Center (HLR/AuC) 310. In practice, the scope of the PLMN system is not limited to the systems described above, it may extent by more BTS or RANs. The coverage areas of BTs 302a and 302b, which BTs 302a and 302b may provide data service, are areas 314a and 314b. SGSN 306 relays the packets over PLMN and is responsible for the Mobility Management (MM) and Session Management (SM). For example, Management for distinct Routing Areas (RA) and distinct Mobile Stations (MS) includes logs of MS position and the packet receiving and transmission processes. GGSN 308 acts as a gateway between the PLMN and external networks such as the Internet 600.

In FIG. 2, both of WLANs as shown are belong to the same authentication server 46b. The first WLAN comprises 3 access points and a gateway 404; the coverage of the first WLAN is 402a to 402c. The second WLAN comprises 2 access points and 1 gateway 504; the coverage of the second WLAN is 502a and 502b. In practice, the WLAN system is not limited to the components described above.

According to the above architecture, providing a wireless terminal 40 which supporting both WLAN and PLMN protocols, for example, users can use the wireless terminal 40 roaming in area 314a shown in the FIG. 2 with the wireless terminal connecting to the base station 302a. The roaming path of a wireless terminal 40 supporting WLAN and PLMN protocols is marked as path A. The wireless terminal 40 registers the internet 600 at point A1 via the PLMN network, for example GPRS network. When the signal from the WLAN is stronger than the PLMN, such as point A2, the wireless terminal stops receiving signals from the PLMN and instead accesses the Internet 600 via the WLAN immediately. The connecting management between the wireless terminal 40 and the access points, 402a, 402b and 402c, is checking if the IP address of the wireless terminal is one of a list of IP address or not. The list of IP address maybe store in access points, 402a, 402b and 402c, or in the gateway 404. Normally, the access point assigns one IP address of the list to the wireless terminal 40, when the wireless terminal 40 passed the authentication.

Mobile IP management device, 46a and 46b, keep the wireless terminal 40's data transmission and data reception uninterrupted when the wireless terminal 40 switching in different network, PLMN & WLAN. Data packets from the wireless terminal 40 are transmitted to the previous PLMN at first, and then transmitted to the current WLAN. As the architecture shows, the mobile IP address of the wireless terminal 40 is the same and the wireless terminal 40 keeping data reception and data uninterrupted when the wireless terminal 40 moves from A1 to A2.

Figure 3:
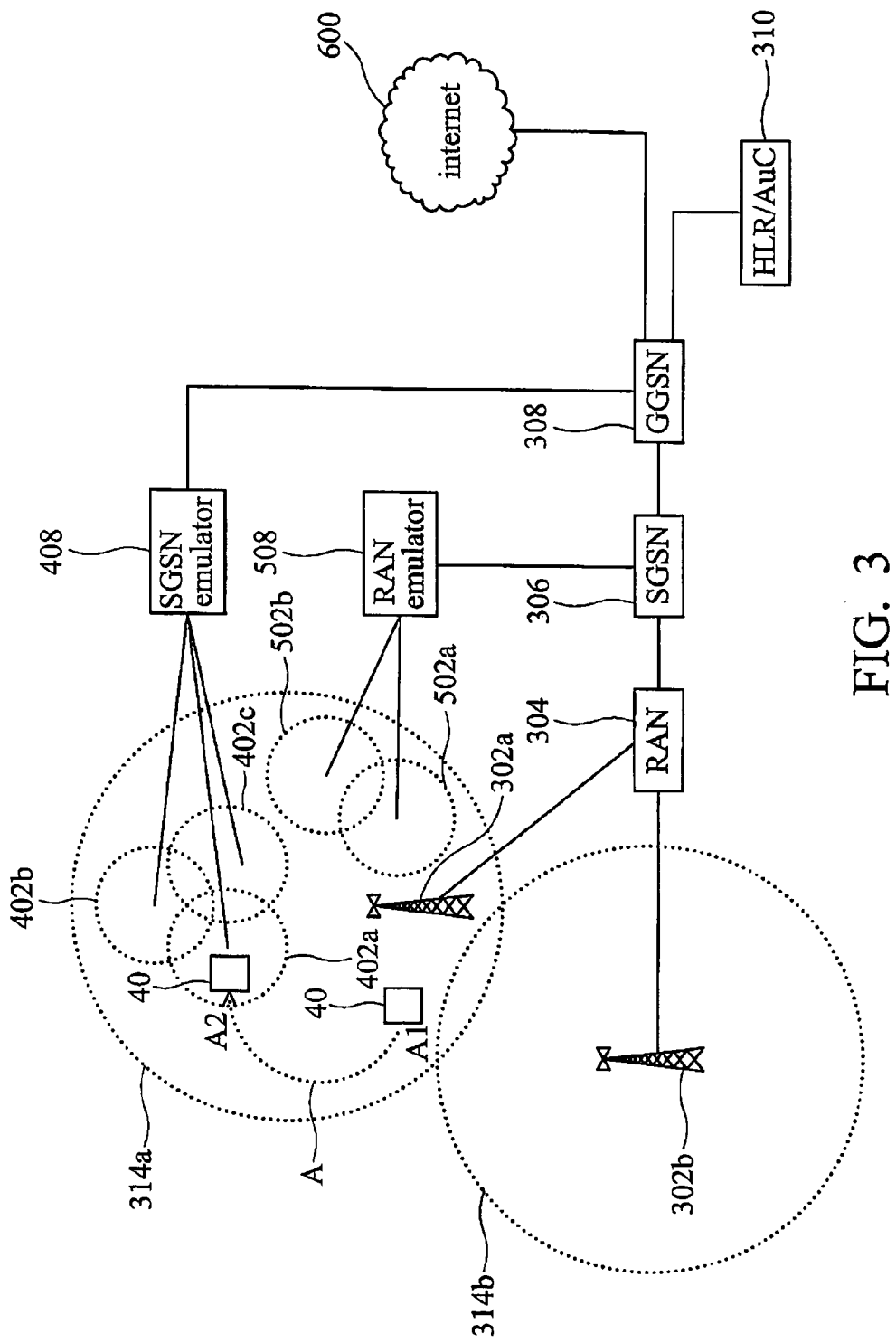
FIG. 3 shows a scheme wherein the WLAN acts as the broadband access network in the PLMN.

FIG. 3 shows the architecture wherein the WLAN acts as the broadband data access network in a PLMN. The architecture shown in FIG. 3 is similar to FIG. 2, with the only difference being that access points providing coverage area 502a and 502b can access the SGSN 306 directly by the RAN simulator 508. Access points providing coverage 402a to 402c can access GGSN 308 via the SGSN simulator 408. With RAN simulator 508 and SGSN simulator 408, nodes providing WLAN services can be treated as PLMN base stations or Serving GPRS Support Nodes (SGSN). The WLAN is treated as a slave network of the PLMN. All data packets, or route seeking should pass through the PLMN backbone; hence devices (46a and 46b) supporting mobile IP are not required by this architecture.

Figure 4:
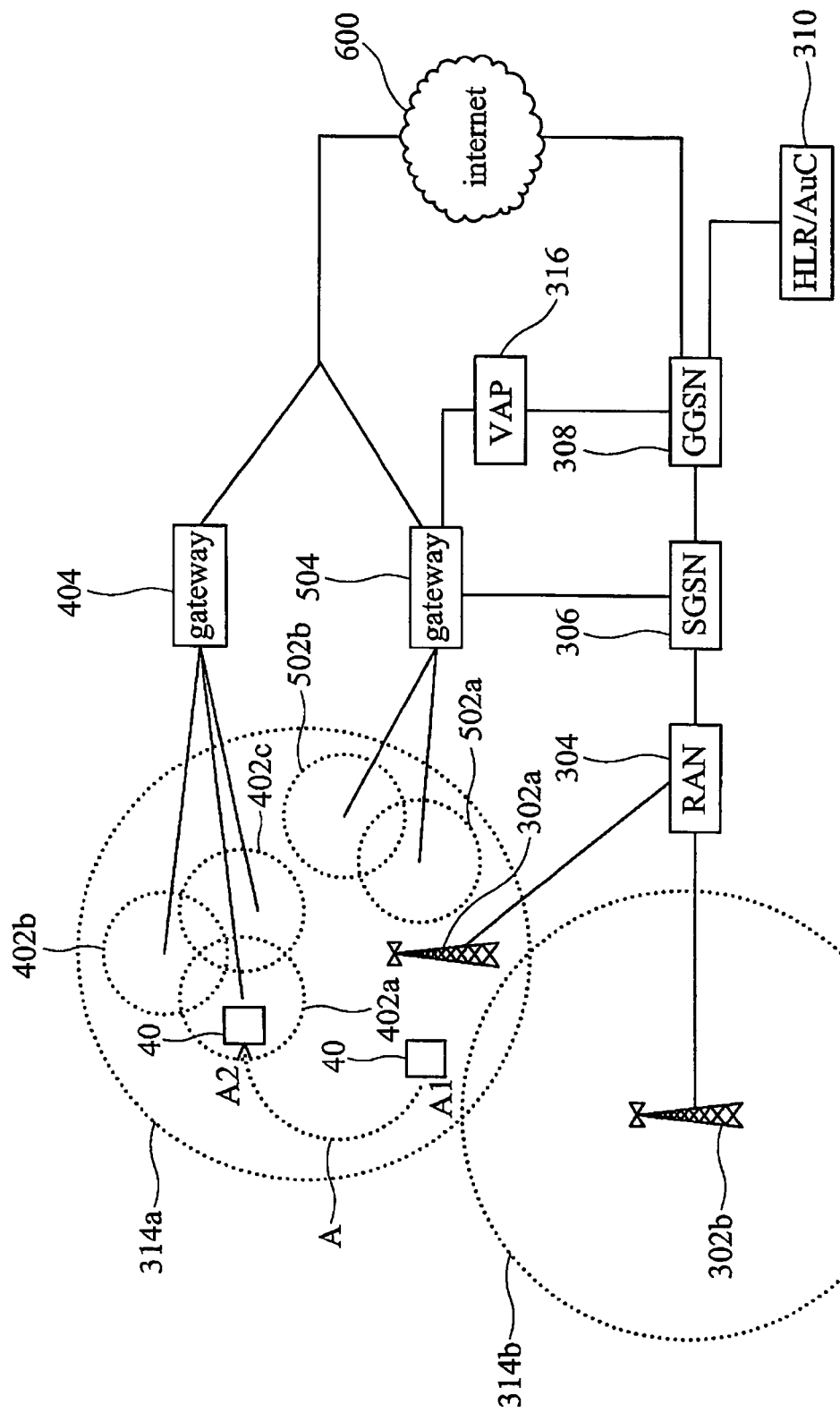
FIG. 4 shows a scheme wherein the PLMN act as the broadband access network in the WLAN.

Additionally, the PLMN can also be treated as a slave network of a WLAN. As shown in FIG. 4, the PLMN acts as a broadband access network for the WLAN. The architectures in FIG. 2 and FIG. 4 are similar, the difference being that the PLMN is managed by Virtual Access Pointer (VAP) 316 and all packet route seeking passes through the WLAN backbone.

Figure 5:
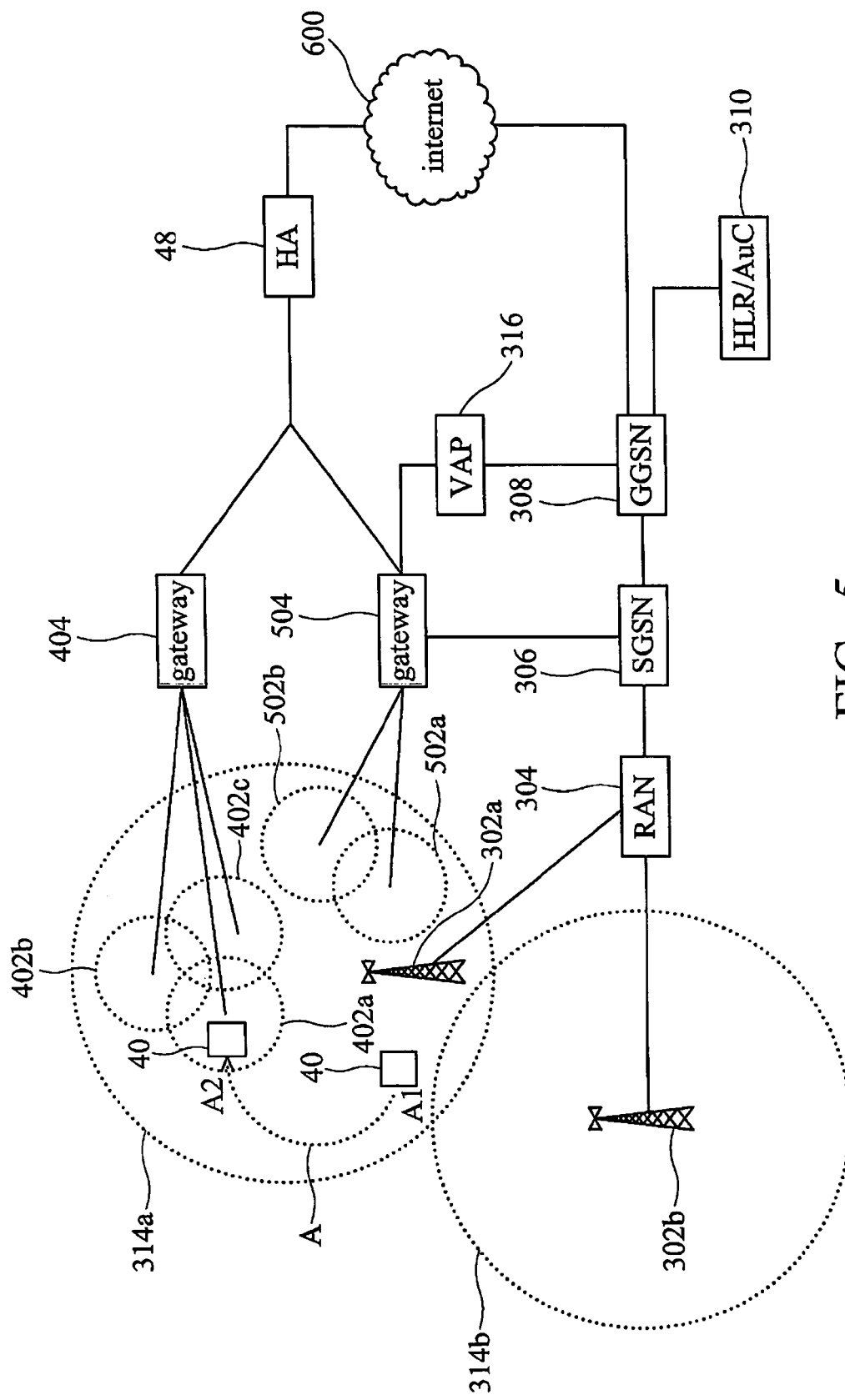
FIG. 5 shows a scheme wherein applying a home agent is applied to connect the PLMN and WLAN.

FIG. 5 shows a scheme employing a home agent to connect the PLMN and WLAN. Architectures in FIG. 2 and FIG. 5 are similar. The difference being that the home agent 48 replaces the role of mobile IP devices 46a and 46b, in transmitting and receiving data uninterruptedly when roaming between different networks. The home agent 48 is applied in the WLAN or PLMN. Using the architecture shown in FIG. 5 as an example, home agent 46 manages the roaming information of the wireless terminal 40.

The method provided by the present invention is not only compatible with the architectures shown in FIG. 2 to FIG. 5 but also for any communication system comprising wireless terminals, PLMS, and at least one WLAN system, wherein the coverage area of the PLMN overlaps and connected those of the WLAN.

A detailed description is given in the following embodiments.

FIRST EMBODIMENT

Figure 6A:
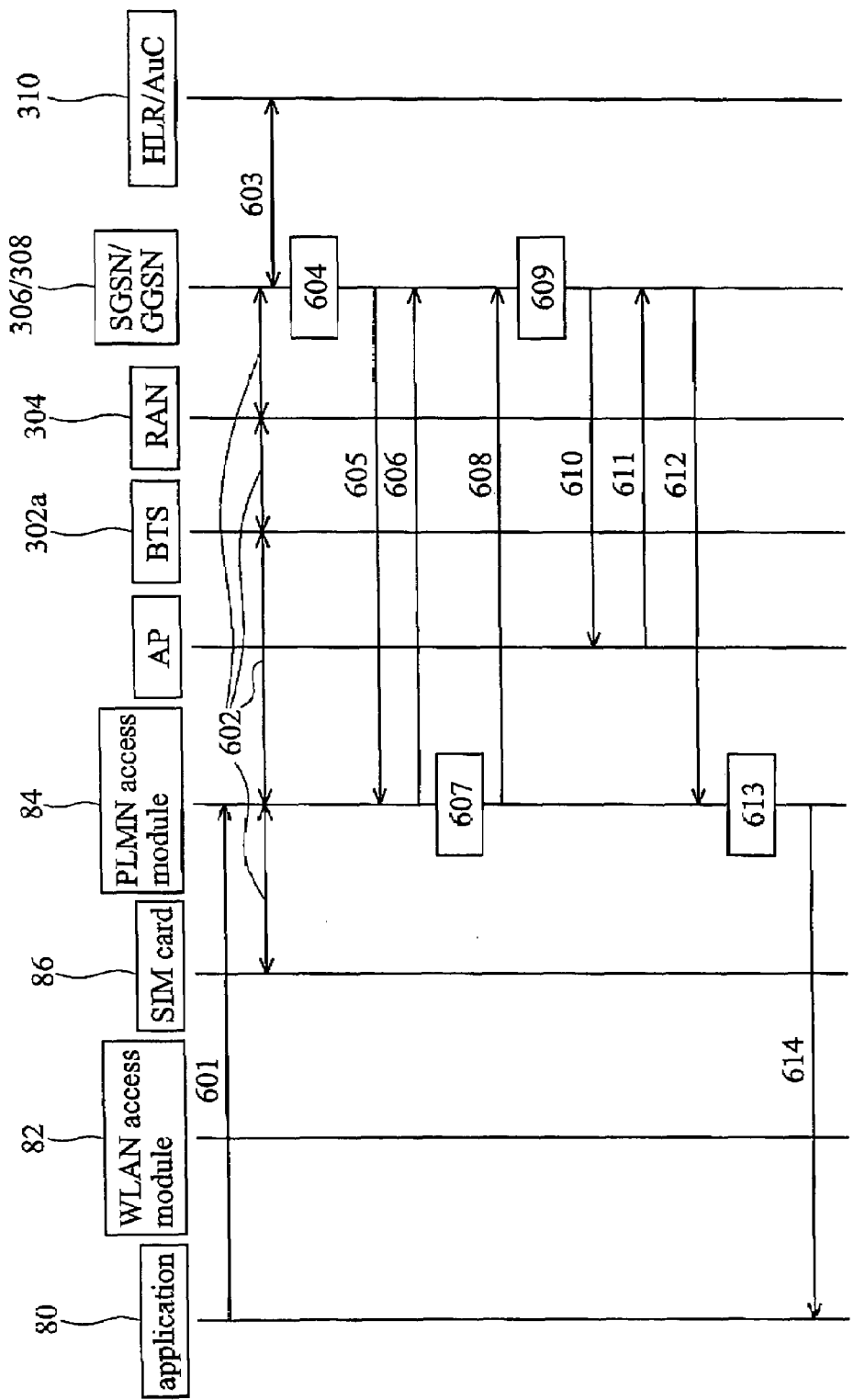
FIG. 6a is a flow chart illustrating the process by which a wireless terminal registers the PLMN and WLAN in example 1.

FIG. 6a shows the flow chart of a method for registration of a wireless terminal on a PLMN and a WLAN.

Figure 8:
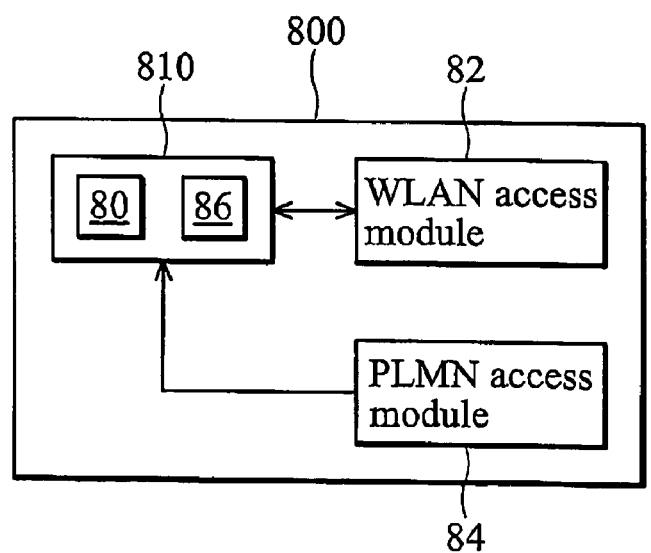
FIG. 8 shows the block diagram of example 1.

In the first embodiment, assume that the wireless terminal has not yet connected with the PLMN, and the wireless terminal comprises an application 80, a WLAN access module 82, a PLMN access module 84 and a SIM card 86. The WLAN access module 82 accesses the WLAN for the wireless terminal. PLMN access module 84 accesses the PLMN for the wireless terminal. The SIM card stores the user ID of the wireless terminal. The detailed description of the wireless terminal is shown in FIG. 8.

Application 80 first generates a request to connect to the WLAN via PLMN access module 84 (step 601).

The PLMN access module 84 then requests to access the PLMN with the user ID stored in the SIM card. The PLMN is, for example, the General Packet Radio Service (GPRS) or Universal Mobile Telecommunication System (UMTS) (Step 602). In Step 602, wireless terminals provide their user IDs through the BTS 302a and RAN 304 to SGSN 306 and GGSN 308. The user ID provided can be either a Packet Temporary Mobile Station Number (P-TMSI) or an International Mobile Subscriber Identity (IMSI).

IF no coding data regarding the wireless terminal is found in SGSN 306, the authentication information exchange will be performed (Step 603). SGSN 306 then requests a plurality of coding data sets corresponding to the wireless terminal. Each data set comprises at least one random number RAND, an Expected User Response (XRES) and a ciphering key (CK).

The SGSN then selects a coding data set, including a random number RND1, an Expected User Response XRES1 and a ciphering key CK1. (Step 604) and sends the random number RND1 to the PLMN access module 84 (Step 605). After receiving the random number RND1, the PLMN access module 84 generates the response signal XRES1' and send XRES1' to SGSN 306 and SGSN 306 checks if XRES1 and XRES1' are the same (Step 606). Moreover, the PLMN access module computes ciphering key CK1 according to the received random number RAND1 (Step 607).

Therefore, the PLMN access module 84 activates a Packet Data Protocol (PDP) context to request from SGSN 306 a packet route between GGSN 308 and itself (Step 608). The PDP context comprises Quality of Service (QoS) Profiles, Network access information, radio area (RA) of the wireless terminal and the corresponding GGSN 308 IP address. The PDP context is released after the end of a service request from the wireless terminals. According to the theory of GPRS or UMTS, GGSN selection occurs only at activation. Put simply, when a wireless terminal activates the packet transmission request, GPRS or UMITS operators pick up an appropriate GGSN then assign it to the wireless terminal according to the Access Point Name (APN) configuration or other GGSN pick up policy. The relationship remains open until PDP context deactivation of the wireless terminals.

GGSN 308 generates an IP address for the wireless terminal (Step 609) to open a session when GGSN 308 has received the PDP context.

SGSN 306 and GGSN 308 transfer the transmission information to access points of the WLANs (Step 610) after Step 609. The access points are selected from the access points under the coverage of the same BTS. The 3 access points in coverage of BTS 302a shown in FIG. 2 are given as an example, wherein the transmission information is including ciphering key CK1 and the IP address of the wireless terminal. When WLAN receives the IP address of the transmission information, the IP address will be stored in the list of IP addresses in access points or in gateway. Any terminal with any IP address in the list of IP addresses can communicate with the WLAN. In this embodiment, access points, virtual access pointer (VAP) or home agents manage the data encryption and decryption by the ciphering key CK1. Furthermore, described methods about transferring transmission information are not limited to those describe above. Other related arts are capable of achieving the goal. For example, broadcasting the transmission information by SGSN 306 or the coverage area of RAN 304 enables the wireless terminals to access different WLAN access points. Another solution is to deliver the transmission information to all access points registered at the same Radio Network Controller (RNC) with RAN 304. Those access points belong to different WLANs.

Thereafter in Step 610, the access Point replies to SGSN 306 and GGSN 308 to confirm that transmission information has been received (Step 611). After the acknowledge signal from the AP, SGSN 306 and GGSN 308 send a signal with the IP address to the PLMN access module 84 of the wireless terminal (Step 612).

The wireless terminal obtains the IP address (Step 613), and the PLMN access module 84 replies with a connection message when connecting the WLAN and an IP address to application 80.

Furthermore, if the wireless terminal is going to hand off to BTS 302b, step 603 to Step 609 can be omitted. SGSN 306 and GGSN 308 transmit the transmission information to all accessible access points in the coverage area BTS 302b, and then proceed from Step 611 to Step 613.

Steps 601 to step 609 may be standard processes for GPRS or UMTS session construction. The wireless terminal is successfully attached to the PLMN after step 609 so that encryption of communication data obtained by the PLMN ciphering key CK1 is possible. Additionally, while the wireless terminal activates the PDP contexts, such as when the wireless terminals are already registered in the PLMN before Step 601 and execution of step 601 begins when the wireless terminal is handed off from the PLMN to the WLAN. Step 603 to Step 609 can be omitted when the ciphering key ck1 is transmitted directly to the WLAN for registration and the transmission data between the wireless terminal and the WLAN is encrypted the ciphering key CK1.

SECOND EMBODIMENT

Figure 6B:
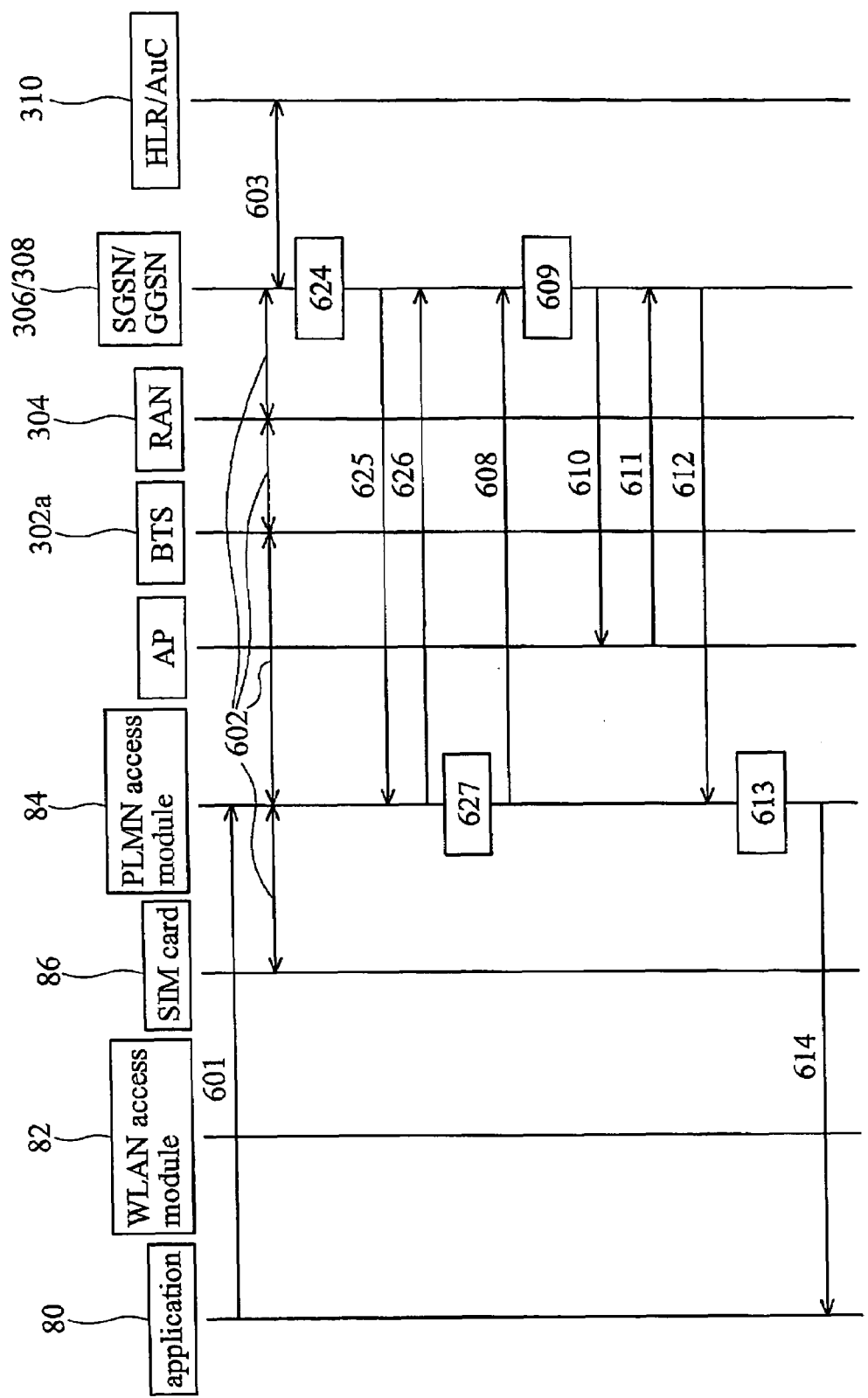
FIG. 6b is the flow chart for registering a wireless terminal to the PLMN and WLAN.
Figure 7:
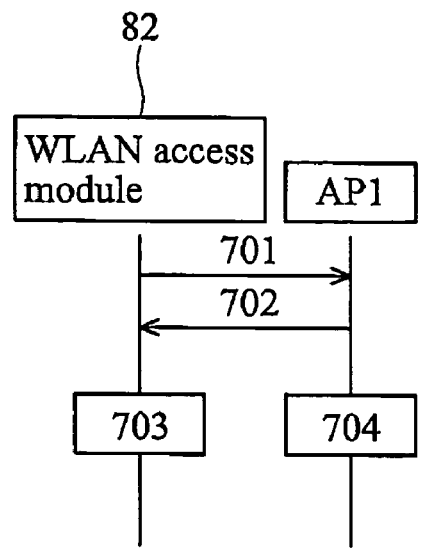
FIG. 7 shows the steps following FIG. 6a and FIG. 6b wherein the wireless terminal communicates with the WLAN.

FIG. 6b shows the flow chart of example 2 of the present invention. The same symbols are used in both FIG. 6a and FIG. 6b. The method shown in example 2 is similar to example 1. The difference is that SGSN 306 picks up 2 coding data sets and generating corresponding random numbers RAND1 and RAND2 (Step 624), then directly transmits RAND1 and RAND2 to PLMN Module 84 (Step 625). After obtaining RAND1 and RAND2, the PLMN module 84 generates a corresponding response XRES1' and reply XRES1' to SGSN 306 for confirm if XRES1 and XRES1' are the same (Step 626), the same as step 606. Moreover, the PLMN module generates ciphering keys CK1 and Ck2 by the received random numbers RAND1 and RAND2 (Step 627). After step 609, communication data over the PLMN can be encrypted by obtained ciphering key CK2. FIG. 7a is a flow chart showing how the wireless terminals access the wireless network subsequent to the steps shown in FIG. 6a and FIG. 6b. While proceeding to Step 610 in FIG. 6a and FIG. 6b, SGSN 306 and GGSN 308 transmit the transmission information to access points of WLANs which in the coverage area BSS 302a shown in FIG. 2, and the wireless terminals can connect access points which provide coverage are labeled as 402a to 402c. Assume that the wireless terminal accesses the AP1 with coverage 402a. WLAN module 82 sends an acknowledge message to access point Ap1. The acknowledge message comprises the IP and Media Access Control (MAC) address of the wireless terminal (Step 701). Since the IP address of the wireless terminal is assigned to AP1 at step 601, access point AP1 may begin a session with the IP address and MAC address with the wireless terminal. If an encryption session is required, ciphering key CK1 obtained from step 610 is applied to confirm the MAC address of received data and encrypt/decrypt communication data between AP1 and the wireless terminal.

After Step 701, access point AP1 replies to the wireless terminal with an ACK message to confirm the start of data encryption (Step 702).

Moreover, with the Wired Equivalency Protocol (WEP) algorithm, access point AP1 encrypts/decrypts the data between itself and the wireless terminal using the same ciphering key CK1 (Step 703 and Step 704). Other algorithms can replace WEP, for example, SGSN 306 and GGSN 308 determines the algorithm used to encrypt/decrypt, the AP1 and wireless terminals are informed in during Step 605 and Step 610.

Additionally, access point AP1 can filter out packets from unauthorized IP addresses, meaning packets from other unregistered wireless terminals or packets to the unregistered wireless terminals will be filtered out. Authorized IP Packets will then be transferred to the destination (not shown in FIG. 7)

FIG. 8 shows a block diagram of wireless terminal of the embodiment 2. As shown in FIG. 8, a wireless terminal can be used for connecting to a PLMN and a WLAN, for example, wherein wireless terminal 800 comprises memory 810, WLAN module 82 and PLMN module 84. Memory 810 comprises a storage unit for application 80 and a SIM card 86. SIM card 86 comprises a user ID related to the wireless terminal 800. While the wireless terminal registers the PLMN, the PLMN module 84 transfers the user ID to the PLMN for registration. After registration, the PLMN module generates ciphering key CK2 and delivers CK2 to wireless terminal 800. After attaching to the PLMN, wireless terminal 800 communicates with other wireless terminals attached to the same PLMN by the PLMN module, and encrypts the data over PLMN by obtained ciphering key CK2.

Before the wireless terminal 800 can register a WLAN, a PLMN check connection is required. If connected, the wireless terminal is handed off from PLMN to WLAN, and a ciphering key for data encryption over the PLMN is applied to register the WLAN and encrypt the data transmitted and received over the WLAN with the same ciphering key.

If the wireless terminal is not yet connected to the PLMN, the PLMN module 84 transfers its ID in advance to register the PLMN. After registering, ciphering key CK1 is generated by the PLMN and transferred to the wireless terminal and the WLAN to register the WLAN. The steps described above are shown in FIG. 6. After registering the WLAN, the wireless terminal 800 can communicate with other wireless terminals registered on the same WLAN and encrypt the data over WLAN with the obtained ciphering key CK1. Additionally, after registering the PLMN, the wireless terminal 800 can communicate with other wireless terminals registered on the same PLMN via the PLMN module 84 and encrypt the data over the PLMN with ciphering key CK1 or another ciphering key CK2.

Figure 9:
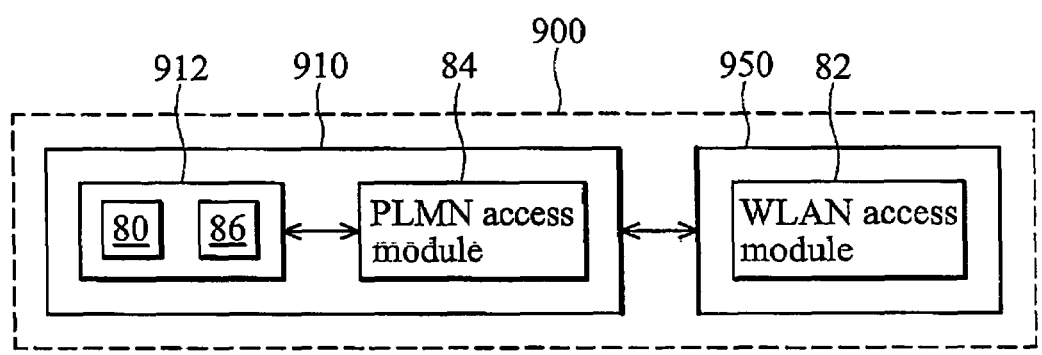
FIG. 9 shows the block diagram of example 2.

FIG. 9 shows the block diagram of example 2. As shown in FIG. 9, the wireless terminal 900 acts as a system comprising a device 910, which is compatible with a PLMN. The device 910 comprises memory 912 and a PLMN module 84. The Device 950 at least comprises WLAN module 82. The memory 912 at least comprises a storage device containing application 80, and SIM card 86 which stores the ID of wireless terminal 900. When the wireless terminal 900 registers the PLMN, the PLMN module 84 transmits the ID to PLMN for registration. After registration, The PLMN generates a ciphering key CK2 and transfers CK2 to device 910. After registering the PLMN, the wireless terminal 900 can communicate with other wireless terminals registered on the same PLMN via the PLMN module 84 and encrypt the data over the PLMN by ciphering key CK2.

Before the wireless terminal 900 registers a WLAN, a PLMN register check is required. If registered, the wireless terminal is handed off from PLMN to WLAN, and a ciphering key for data encryption over the PLMN is applied to register the WLAN and encrypt the data transmitted and received over the WLAN with the same ciphering key.

If the wireless terminal has not yet connected to the PLMN, the PLMN module 84 transfers ID in advance to register PLMN. After registration, the ciphering key CK1 generated by the PLMN is transmitted to the wireless terminal 910 and the WLAN to register the WLAN. The steps described above are shown in FIG. 6. After registering the WLAN, the wireless terminal 800 can communicate with other wireless terminals registered on the same WLAN and encrypt the data over WLAN with the obtained Ciphering key CK1. Additionally, after registering the PLMN, the wireless terminal 800 can communicate with other wireless terminals registered on the same PLMN via the PLMN module 84 and encrypt the data over the PLMN with ciphering key CK1 or another ciphering key CK2.

In summary, the method provided by present invention can achieve the goal of secure and efficient wireless terminal registration on a WLAN.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for a wireless terminal to register a communication system, the communication system having a Public Land Mobile Network (PLMN) and at least one Wireless Local Area Network (WLAN), the wireless terminal having a PLMN access module and a WLAN access module, wherein the PLMN interconnects to the WLAN, the PLMN comprising a first base station and the WLAN comprising a first access point, and the method comprising the following steps:
   (A) assigning a user ID to the wireless terminal for registration of the PLMN;
   (B) establishing a direct PLMN connection between the wireless terminal and the PLMN to directly transmit the user ID via the PLMN access module to the PLMN through the first base station, and registering the wireless terminal to the PLMN with the user ID;
   (C) generating an authentication code from the registration at the PLMN, and transmitting the authentication code to the wireless terminal via the direct PLMN connection through the first base station;
   (D) the PLMN transmitting the authentication code to a WLAN via the interconnection therebetween; and
   (E) establishing a WLAN connection via the WLAN access module between the wireless terminal and the WLAN through the first access point by the authentication code.

2. The method as claimed in claim 1, wherein the PLMN access module transmits the user ID to the first base station of the PLMN, the coverage of the first base station and the WLAN are overlapping.

3. The method as claimed in claim 1, wherein the authentication code comprises an IP address.

4. The method as claimed in claim 1, wherein the step B further comprises:
   the PLMN generating a first ciphering key according to the user ID;
   transmitting the first ciphering key to the wireless terminal through the first base station; and encrypting communication data through the first base station between the PLMN and the wireless terminal by the first ciphering key.

5. The method as claimed in claim 4, wherein the step D further comprises:
the PLMN transmitting the first ciphering key to the WLAN; and
the step E further comprises encrypting communication data between the WLAN and the wireless terminal by the first ciphering key.

6. The method as claimed in claim 1, wherein the step B further comprises:
the PLMN generating a first ciphering key and a second ciphering key according to the user ID;
transmitting the first and second ciphering keys to the wireless terminal;
the PLMN transmitting the second ciphering key to the WLAN via the interconnection therebetween;
encrypting communication data through the first base station between the PLMN and the wireless terminal by the first ciphering key; and
encrypting communication data through the first access point between the WLAN and the wireless terminal by the second ciphering key.

7. The method as claimed in claim 1, wherein:
the wireless terminal transmitting a request to the first base station via the PLMN access module; and
the coverage area of the first base station overlaps the coverage areas of M WLAN networks, and the PLMN transmits the authentication code to the M WLAN networks.

8. The method as claimed in claim 7, wherein when the wireless terminal is handed off to a second base station belonging to the PLMN, the coverage area of which overlaps N WLAN networks, the PLMN transmits the authentication code to the N WLAN networks.

9. The method as claimed in claim 1, wherein the step C further comprises:
the wireless terminal transmitting the Packet Data Protocol (PDP) context request through the first base station to the PLMN for the WLAN connection between the wireless terminal and the WLAN.

10. The method as claimed in claim 1, wherein the step D further comprising:
the PLMN transmitting the authentication code to the first access point of the WLAN; and
the wireless terminal accessing the first access point by the authentication code.

11. The method as claimed in claim 1, wherein the wireless terminal is a communication device for switching operational modes between mode I and mode II, mode I operates on Wide Area Networks while Mode II operates on Local Area Networks.

12. The method as claimed in claim 1, wherein:
the PLMN access module supports a PLMN protocol;
the WLAN access module supports a WLAN protocol;
the wireless terminal is registered to the PLMN with the user ID by the PLMN protocol; and
the WLAN connection is established by the wireless terminal.

13. A communication system, comprising:
a Wireless Local Area Network (WLAN) comprising a first access point;
a Public Land Mobile Network (PLMN) comprising a first base station; and
a wireless terminal having a PLMN access module and a WLAN access module, wherein:
the PLMN access module sends a user ID of the wireless terminal to the PLMN through the first base station, establishing a direct PLMN connection between the wireless terminal and the PLMN,
the PLMN generates an authentication code corresponding to the user ID and transmits the authentication code to the wireless terminal via the direct PLMN connection through the first base station;
the PLMN further transmits the authentication code to the WLAN via an interconnection therebetween, such that the wireless terminal establishes a WLAN connection with the WLAN through the first Access point by the authentication code via the WLAN access module.

14. The communication system as claimed in claim 13, wherein the authentication code comprises an IP address.

15. The communication system as claimed in claim 13, wherein the PLMN generates the authentication code while receiving a request for a Packet Data Protocol (PDP) context generated by the wireless terminal through the first base station.

16. The communication system as claimed in claim 13, wherein the PDP context comprises BS ID of the first base station, the first base station providing services for the wireless terminals.

17. The communication system as claimed in claim 13, wherein the PLMN generates a first ciphering key and transmits it to the WLAN and the wireless terminal, the first ciphering key is used to encrypt the data transmitted through the first base station between the PLMN and the wireless terminal.

18. The communication system as claimed in claim 13, wherein:
the PLMN further generates a first ciphering key and a second ciphering key, both transmitted to the wireless terminal via the direct PLMN connection;
the second ciphering key is also transmitted to the WLAN via an interconnection between the PLMN and the WLAN; and
the wireless terminal encrypts a first data transmitted to the PLMN with the first ciphering key and encrypts a second data transmitted to the WLAN with the second ciphering key.

19. The communication system as claimed in claim 13, wherein the PLMN access module transmits the user ID to the first base station of the PLMN, the coverage of the first base station and the WLAN are overlapping.

20. The communication system as claimed in claim 13, wherein
the PLMN access module supports a PLMN protocol;
the WLAN access module supports a WLAN protocol;
the wireless terminal is registered to the PLMN with the user ID by the PLMN protocol; and
the WLAN connection is established by the wireless terminal.

21. A wireless terminal selectively communicating with a Public Land mobile Network (PLMN) and a Wireless Local Area Network (WLAN), the PLMN comprising a first base station and the WLAN comprising a first Access point, wherein the PLMN interconnects to the WLAN, the wireless terminal comprising:
a memory for storing an user ID;
a PLMN access module for sending the user ID to the PLMN through the first base station via a direct PLNM connection established between the wireless terminal and the PLMN for registration, wherein the PLMN generates an authentication code and transmits the authentication code to the PLMN access module via the direct PLMN connection after registration, and the WLAN directly receives the authentication code from the PLMN via the interconnection therebetween;

a WLAN access module for establishing a WLAN connection between the wireless terminal and the WLAN through the first access point by the authentication code.

22. The wireless terminal as claimed in claim 21, wherein the authentication code comprises an IP address.

23. The wireless terminal as claimed in claim 21, wherein the PLMN further generates a first ciphering key and transmits it to the WLAN and the wireless terminal, then encrypts the data communicating through the first base station between the PLMN and the wireless terminal with the ciphering key.

24. The wireless terminal as claimed in claim 21, wherein the PLMN generates a first ciphering key and a second ciphering key, and transmits both the first ciphering key and the second ciphering key to the wireless terminal, then transmits the second ciphering key to the WLAN, the wireless terminal encrypts a first data sending to the PLMN through the first base station with the first ciphering key and encrypts a second data sending to the WLAN through the first Access point with the second ciphering key.

25. The wireless terminal as claimed in claim 21, wherein the PLMN access module transmits the user ID to the first base station of the PLMN, the coverage of the first base station and the WLAN are overlapping.

* * * * *